No. 768,219. PATENTED AUG. 23, 1904.
J. W. GARLAND.
CHAIN WELDING APPARATUS.
APPLICATION FILED NOV. 4, 1901.
NO MODEL. 5 SHEETS—SHEET 4.

WITNESSES:
H. M. Corwin
L. M. Redman

INVENTOR
John W. Garland
BY Bakewell & Byrnes
HIS ATTORNEYS

No. 768,219. PATENTED AUG. 23, 1904.
J. W. GARLAND.
CHAIN WELDING APPARATUS.
APPLICATION FILED NOV. 4, 1901.
NO MODEL. 5 SHEETS—SHEET 5.
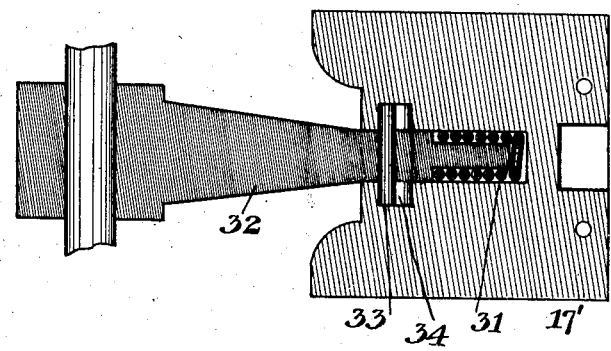
Fig.10.
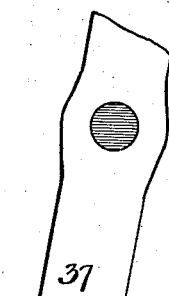
Fig.11.
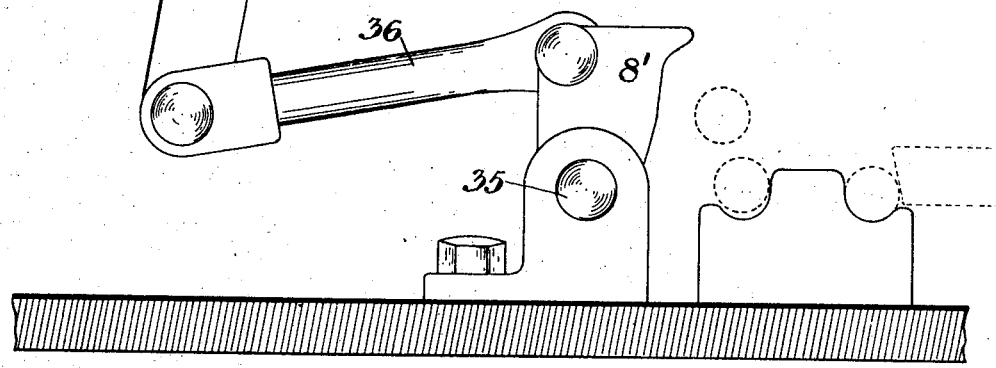
WITNESSES
H. V. McCorim
L. M. Redman
INVENTOR
John W. Garland
BY Bakewell & Byrnes.
HIS ATTORNEYS No. 768,219.

Patented August 23, 1904.

UNITED STATES PATENT OFFICE.

JOHN W. GARLAND, OF PITTSBURG, PENNSYLVANIA.

CHAIN-WELDING APPARATUS.

SPECIFICATION forming part of Letters Patent No. 768,219, dated August 23, 1904.

Application filed November 4, 1901. Serial No. 81,016. (No model.)

*To all whom it may concern:*

Be it known that I, JOHN W. GARLAND, of Pittsburg, Allegheny county, Pennsylvania, have invented a new and useful Chain-Welding Apparatus, of which the following is a full, clear, and exact description, reference being had to the accompanying drawings, forming part of this specification, in which—

Figure 1:
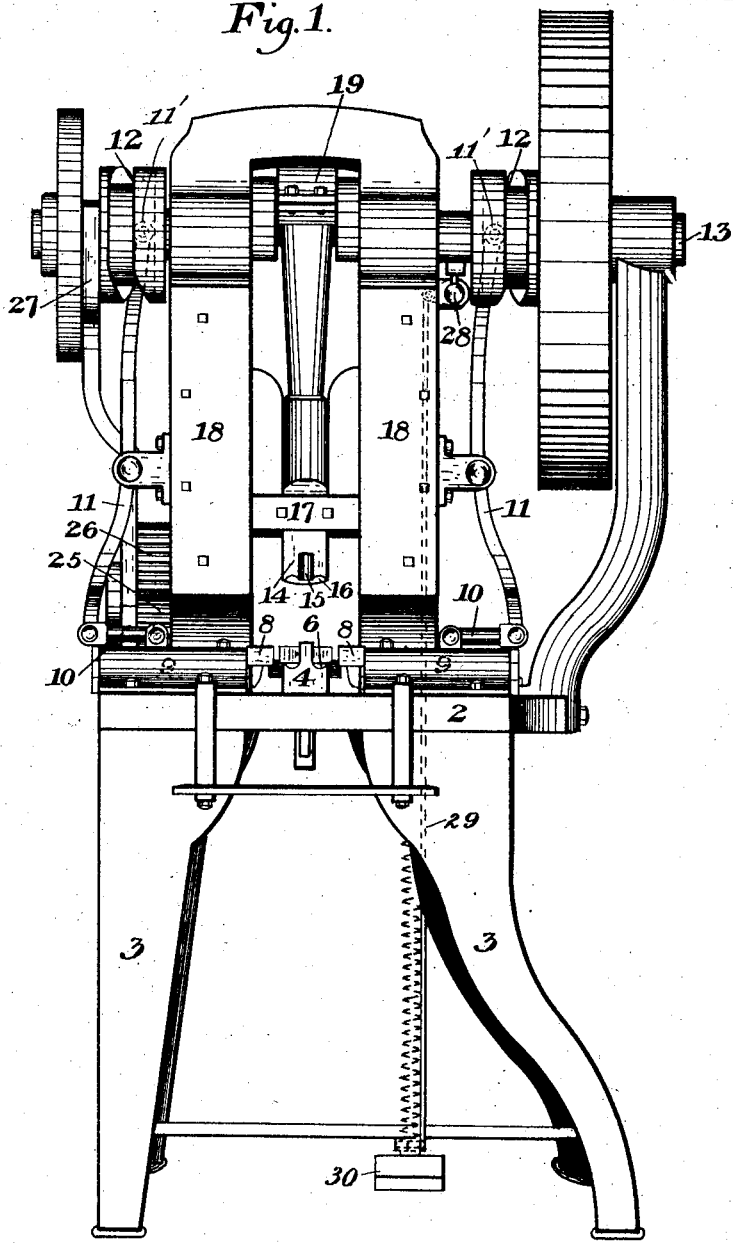
Figure 2:
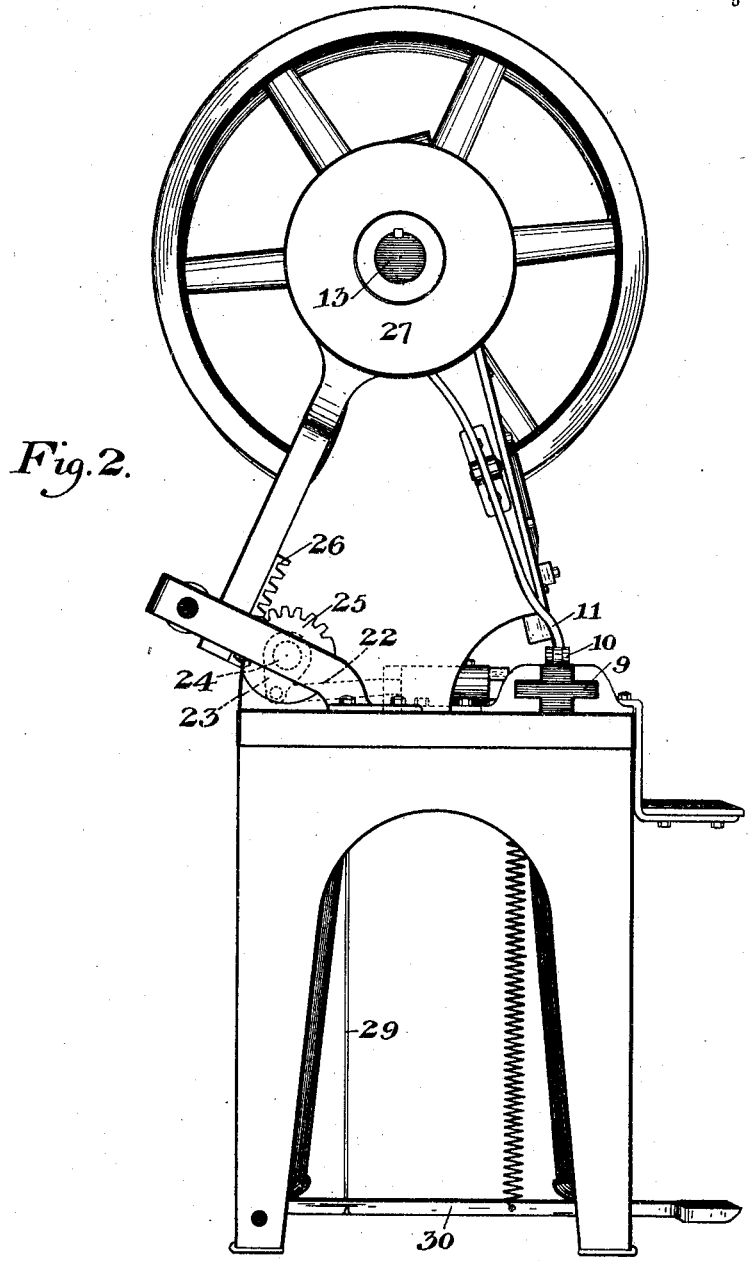
Figure 3:
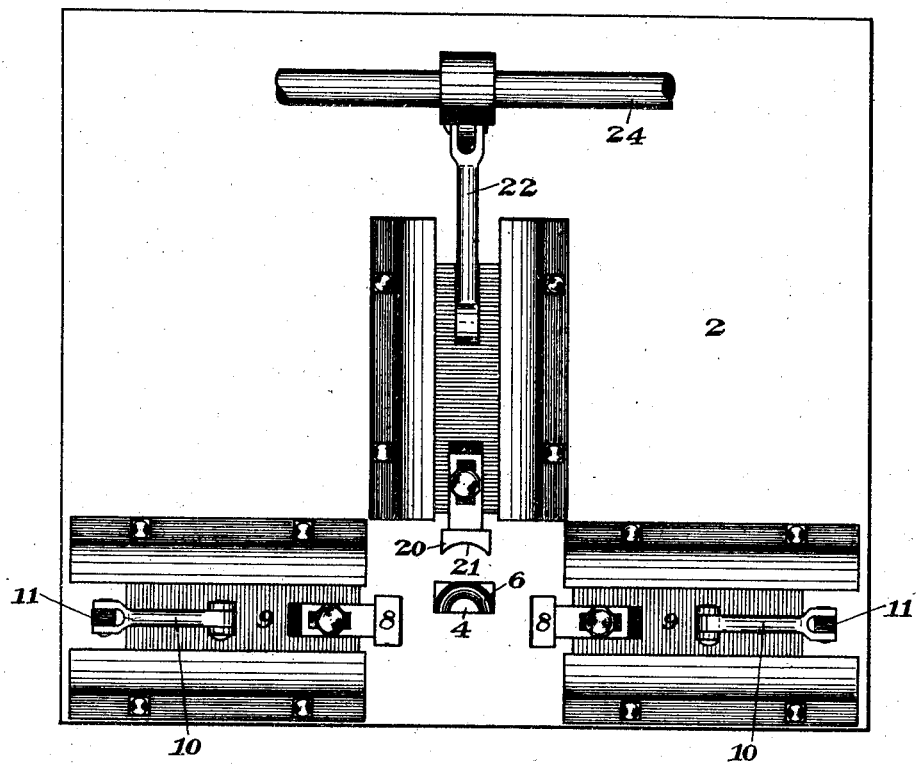
Figure 4:
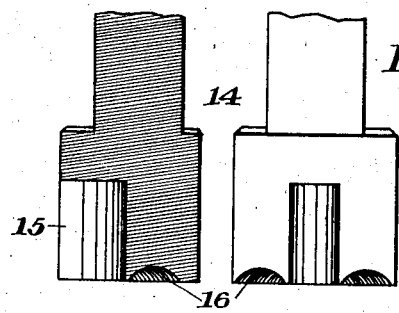
Figure 7:
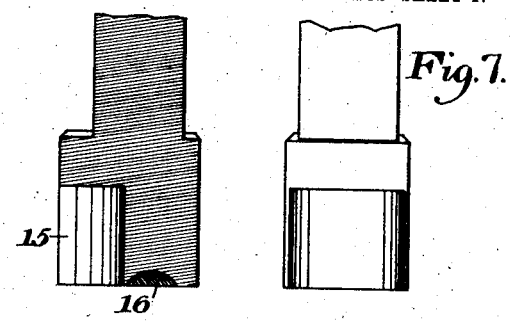
Figure 5:
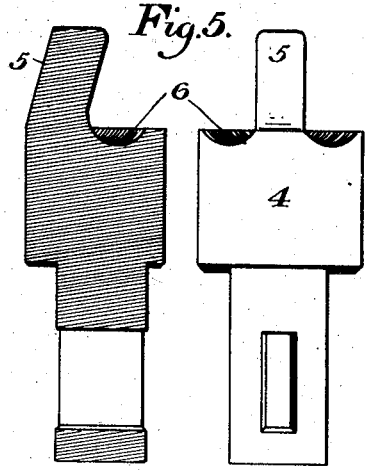
Figure 8:
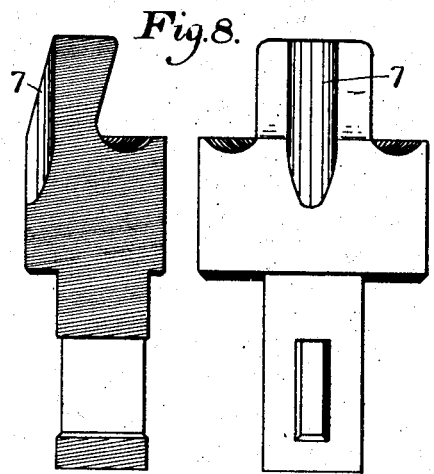
Figure 6:
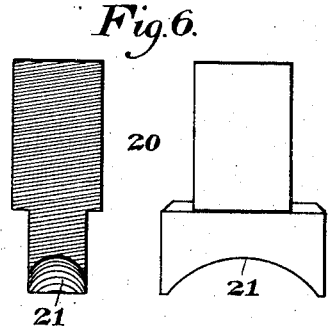
Figure 9:
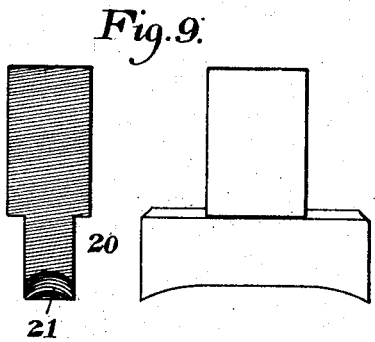

Figure 1 is a front elevation of a machine constructed in accordance with my invention. Fig. 2 is a side elevation of the same. Fig. 3 is a partial plan view showing the dies in retracted position. Figs. 4, 5, and 6 are detail views of the top die, the bottom die, and the back die used in end welding. Figs. 7, 8, and 9 are similar views showing the top, bottom, and back dies, respectively, for side welding. Fig. 10 is a detail sectional view of a modified form of the upper die-block, and Fig. 11 is a detail view showing a modified form of the side die and its actuating connection.

My invention relates to machinery for welding scarfed chain-links and is designed to do away with the hand methods heretofore used and provide a machine which will carry out the operation rapidly and successfully and without the production of fins.

To that end it consists in a top and bottom die, at least one of which is movable toward and from the other, one of these dies having a projecting nose, in connection with side dies which are forced in toward the supporting-die.

It also consists in the above combination, together with a movable back die which prevents finning, and, further, in certain constructions and arrangements of the parts hereinafter described and claimed.

In the drawings, 2 represents the table of a welding-press supported upon suitable legs 3. Upon the central forward portion of the table is secured a bottom die 4, which is preferably of the form shown in either Fig. 5 or Fig. 8. When used for end welding, the die is provided with an upwardly-projecting nose 5, which is preferably inclined rearwardly, the die having a curved groove 6 around the base of the nose. The die of Fig. 8, which is used for side welding, is substantially the same as that of Fig. 5, except as to dimensions, and, further, that the nose contains a front groove 7, arranged to receive the link which is threaded through the link being welded.

The side dies 8 8 are preferably plain blocks having either flat hollow grooved or curved faces and secured to slides 9, having link connections 10 with levers 11, carrying rollers 11', acted upon by cams 12 upon the main shaft 13 of the machine. A reciprocating movement is thus given each side die, the dies being moved inwardly toward the bottom die to clamp and size the link before the top die is moved downwardly.

The upper die 14 is provided with a recess 15 and a groove 16, surrounding the same, the die for end welding of Fig. 4 being similar to that for side welding of Fig. 7 except as to the dimensions of the block, the shape of the groove and recess, &c. This top die is secured in the ordinary manner to a die-block 17, guided between the uprights 18 and driven from crank 19 in shaft 13. It will be noted that the top die moves downwardly at an angle to the vertical, as shown in Fig. 2, and I have found this movement to be of special advantage in properly clamping and welding the parts, though the die may be grooved in a vertical plane, if desired. The side dies may also be moved in and out at angles to the horizontal plane.

The back die 20 is in the form of a plain block having a curved recess 21 in the front curved face of the block. This front face and recess are curved to fit either the end of the link, as shown in Fig. 6, or to fit the side of the link, as shown in Fig. 9. The back die may be reciprocated by any suitable connections, and I have shown it as connected by link 22 and crank 23 to a rock-shaft 24, carrying a segmental gear 25, engaging a reciprocating rack 26, driven from cam 27 on the main shaft.

In the operation of the machine the link to be welded is placed upon the bottom die with the next link threaded through it. The machine being started into operation through a clutch 28 or other suitable clutch, operated by link 29 and foot-lever 30, the side dies are forced inwardly and engage the sides or ends of the link, according to the particular dies used. The upper die is then forced downwardly, thus welding the lapped or scarfed rear parts of the link, and the back die is then forced forwardly to prevent any finning at the weld. The removable dies then being retracted another unwelded link is slipped through the one just welded, placed upon the lower die, and the operation repeated.

Instead of using a rigid top die I may connect the die-block to its connecting-rod by spring or yielding connection. Thus in Fig. 10 I show the die-block 17' having pocket containing a spiral spring 31, which is acted upon by the end of the connecting-rod 32, the pin 33 extending through the rod and moving in pocket 34. The action of the upper die may thus be cushioned to prevent injury to the link, though this may or may not be used, as desired.

Instead of moving the side dies by means of slides I may give these dies a compound motion. Thus in Fig. 11 I show a side die 8', which is pivotally mounted at 35. The upper part of this die is connected by pivotal link 36 with lever 37, suitably actuated upon a moving part. The advantage of this movement of the side die is that it aids in forcing down the bent-up side portion of the link and brings both the side portions properly into the grooves in the lower die. I show in dotted lines the side bars of the link, the upper circle indicating the position of the one side bar before it is forced down into the groove by the die 8'. This swinging or compound motion side die may be used on one or both sides, though it is only needed upon one side.

The advantages of my invention flow from the use of the top and bottom dies in connection with the side dies, these dies automatically and quickly carrying out the welding operation, and, further, from the use of the back die, which acts to prevent finning.

The upper and lower dies may be reversed and many other variations may be made in the form and arrangement of the parts in the direction of movement of the dies and in the shape of the dies without departing from my invention. The cams may be made adjustable, so that they can be changed to suit the different sizes or shapes and lengths.

The speed of the machine may be changed by suitable gearing to change the speed according to the size of the links, and one blow or a number of blows may be used, as may be desired.

I claim—

1. In machines for welding chain-links, a pair of dies, at least one of which is movable toward and from the other, one of said dies having a projecting nose arranged to enter the link, side dies, mechanism for moving the side dies inwardly to clamp the sides of the link, and mechanism for closing the top and bottom dies after the link is clamped; substantially as described.

2. In machines for welding scarfed links, a pair of dies, at least one of which is movable toward and from the other, one of said dies having a projecting nose arranged to enter the link, movable side dies, a movable back die, mechanism for moving in the side dies to clamp the link, and mechanism for thereafter successively closing the pair of dies and then moving the back die forwardly; substantially as described.

3. In machines for welding scarfed links, a top and bottom die, at least one of which is movable toward and from the other, said dies being shaped to fit a chain-link, a side die, and mechanism arranged to give compound motion to the side die to force down and clamp the upwardly-projecting leg of the link; substantially as described.

4. In machines for welding scarfed links, a pair of dies, at least one of which is movable toward and from the other, one of said dies having a projecting nose arranged to enter the link, movable side dies, a movable back die, mechanism for moving in the side dies to clamp the link, and mechanism for thereafter moving in the pair of dies and the back die; substantially as described.

5. In machines for welding scarfed links, a top and bottom die having an interfitting nose and recess therefor, and provided with grooved portions arranged to coact upon the joint, and movable side dies arranged to be forced against the link; substantially as described.

In testimony whereof I have hereunto set my hand.

JOHN W. GARLAND.

Witnesses:
FRANK PETSCH,
ALFRED SANG.